(12) United States Patent
Hatambeiki

(10) Patent No.: US 9,621,948 B2
(45) Date of Patent: Apr. 11, 2017

(54) SYSTEM AND METHOD FOR PRIORITIZING AND FILTERING CEC COMMANDS

(71) Applicant: Universal Electronics Inc., Santa Ana, CA (US)

(72) Inventor: Arsham Hatambeiki, San Diego, CA (US)

(73) Assignee: Universal Electronics Inc., Santa Ana, CA (US)

( * ) Notice: Subject to any disclaimer, the term of this patent is extended or adjusted under 35 U.S.C. 154(b) by 105 days.

(21) Appl. No.: 14/608,384

(22) Filed: Jan. 29, 2015

(65) Prior Publication Data

US 2016/0227272 A1    Aug. 4, 2016

(51) Int. Cl.
| | | |
|---|---|---|
| H04N 7/16 | (2011.01) | |
| H04N 7/18 | (2006.01) | |
| H04N 21/4367 | (2011.01) | |
| H04N 21/4627 | (2011.01) | |
| H04N 21/254 | (2011.01) | |
| H04N 21/4363 | (2011.01) | |

(52) U.S. Cl.
CPC ..... *H04N 21/4367* (2013.01); *H04N 21/2541* (2013.01); *H04N 21/43635* (2013.01); *H04N 21/4627* (2013.01)

(58) Field of Classification Search
CPC .......... H04N 21/4627; H04N 21/4367; H04N 21/2541
USPC ...................................... 725/25, 80
See application file for complete search history.

(56) References Cited

U.S. PATENT DOCUMENTS

| | | | |
|---|---|---|---|
| 8,850,573 B1 | 9/2014 | Chen et al. | |
| 8,990,574 B1* | 3/2015 | Priyadarshi | H04L 63/0823 713/176 |
| 2008/0247544 A1* | 10/2008 | Candelore | H04N 7/163 380/241 |
| 2010/0306827 A1* | 12/2010 | Esteve Balducci | H04L 63/105 726/4 |
| 2011/0283349 A1* | 11/2011 | Wu | H04M 1/663 726/11 |
| 2012/0021684 A1* | 1/2012 | Schultz | H04B 5/0043 455/41.1 |
| 2012/0047262 A1* | 2/2012 | Laarakkers | H04L 63/145 709/225 |
| 2012/0086563 A1 | 4/2012 | Arling et al. | |

(Continued)

OTHER PUBLICATIONS

ISA/US, International Search Report and Written Opinion issued on PCT application No. US16/14708, dated Apr. 1, 2016, 11 pages.

*Primary Examiner* — James R Sheleheda
(74) *Attorney, Agent, or Firm* — Greenberg Traurig, LLP

(57) ABSTRACT

A first controllable appliance receives from a second controllable appliance a command for causing the first controllable appliance to be placed into a state and, in response, determines a trust level of the second controllable appliance. When it is determined that the second controllable appliance is trustworthy, the first controllable appliance executes the command. When it is determined that the second controllable appliance is untrustworthy, the first controllable appliance ignores the command. Otherwise, the first controllable appliance enters into a state in which the first controllable appliance waits for at least a predetermined period of time for a user to confirm whether or not the first controllable appliance should be caused to execute the command.

17 Claims, 5 Drawing Sheets

(56) References Cited

U.S. PATENT DOCUMENTS

| | | |
|---|---|---|
| 2012/0192251 A1 | 7/2012 | Faiman et al. |
| 2012/0194325 A1 | 8/2012 | Haughawout et al. |
| 2012/0266221 A1 | 10/2012 | Castelluccia et al. |
| 2012/0290694 A9* | 11/2012 | Marl .................. H04L 12/2807 709/223 |
| 2013/0076989 A1 | 3/2013 | Barnett et al. |
| 2013/0191458 A1* | 7/2013 | Krishnan ................ H04L 67/22 709/204 |
| 2014/0002247 A1* | 1/2014 | Harrison ................ H04L 63/10 340/12.5 |
| 2014/0096179 A1 | 4/2014 | Ben-Shalom et al. |
| 2014/0215558 A1* | 7/2014 | Hoyos .................. H04L 63/105 726/3 |
| 2014/0215575 A1* | 7/2014 | Hoyos .................. H04L 63/105 726/4 |
| 2015/0089568 A1* | 3/2015 | Sprague ............. H04L 63/0876 726/1 |
| 2015/0188891 A1* | 7/2015 | Grange .............. H04L 63/0428 380/270 |
| 2016/0066184 A1* | 3/2016 | Bhargav-Spantzel .. G06F 21/40 726/7 |
| 2016/0080041 A1* | 3/2016 | Schultz ................ H04B 5/0043 455/41.1 |
| 2016/0080475 A1* | 3/2016 | Singh .................. H04L 67/10 709/217 |
| 2016/0105424 A1* | 4/2016 | Logue ................ H04L 63/0823 726/7 |
| 2016/0112203 A1* | 4/2016 | Thom .................. H04L 9/3247 713/176 |
| 2016/0180806 A1* | 6/2016 | Sharp .................... G09G 5/006 345/520 |

* cited by examiner

| Device identity | Device name | Trust level |
|---|---|---|
| Device #1 | DVD player | Trusted |
| Device #2 | Game system | Excluded |
| Device #3 | Streaming media player | Untrusted |
| Device #4 | Cable STB | Trusted |

Figure 3A

| Device identity | Device name | Trust level |
|---|---|---|
| AV receiver state: Powered on | | |
| Device #1 | DVD player | Excluded |
| Device #2 | Game system | Excluded |
| Device #3 | Streaming media player | Untrusted |
| Device #4 | Cable STB | Trusted |

| Device identity | Device name | Trust level |
|---|---|---|
| AV receiver state: Powered off | | |
| Device #1 | DVD player | Trusted |
| Device #2 | Game system | Excluded |
| Device #3 | Streaming media player | Untrusted |
| Device #4 | Cable STB | Trusted |

Figure 3B

SYSTEM AND METHOD FOR PRIORITIZING AND FILTERING CEC COMMANDS

BACKGROUND

Interconnections between consumer appliances such as televisions, set top boxes for receiving and decoding cable and satellite signals, AV receivers, DVD players, game systems, streaming media adapters, etc., may take the form of digital interfaces based upon, for example, the High-Definition Multimedia Interface (HDMI) standard. In addition to supporting high quality audio/video signals, such digital interconnections may facilitate the exchange of commands, identity information, and capability data between devices. In particular, when interfaced via an HDMI connection, devices which support a feature known as Consumer Electronic Control (CEC) may be enabled to command and control each other over the HDMI connection without user intervention. This feature allows one button control of various functions such as system-wide power on, etc., in those systems where HDMI connected devices support the CEC feature. However, while generally useful, the CEC feature may become problematical if one or more source devices in an HDMI-interconnected system are not well behaved and command a device such as an AV receiver or television to change inputs at inopportune and/or random times. Such unexpected operation is sufficiently prevalent that many television and AV receiver manufacturers may ship their product with the CEC control feature defaulted to "off."

SUMMARY

The following generally describes home entertainment systems comprising various media source and rendering devices interconnected via HDMI technology and supporting CEC functionality, and more particularly describes a system and method for filtering CEC commands by a recipient device in order to eliminate or minimize unexpected operation and/or continuous messages which may be caused by ill-behaved devices. To this end, an input-switchable device such as an AV receiver or a television set may be provisioned with software which serves to identify the originator of a CEC input switching request and ascertain a trust level parameter associated with that originating device. The action subsequently taken by the receiving device may then be determined based on the trust level of the requesting device. By way of example, actions based on the trust level may include acting on the request immediately, prompting the user to confirm before performing the requested action, or ignoring the request completely. Whenever a new device is introduced into the system an initial trust rating may be assigned to that device, either directly by a user or, in some embodiments, by reference to a local or remote database of known devices. Provision may also be made for trust ratings to be subsequently adjusted by the user if desired.

A better understanding of the objects, advantages, features, properties and relationships of the described systems and methods will be obtained from the following detailed description and accompanying drawings which set forth illustrative embodiments and which are indicative of the various ways in which the principles of the claimed invention may be employed.

BRIEF DESCRIPTION OF THE DRAWINGS

For a better understanding of the various aspects of the described system and method, reference may be had to preferred embodiments shown in the attached drawings in which:

FIGS. 3A and 3B illustrate exemplary device trustworthiness tables which may be utilized by the programming of the AV receiver of FIG. 2;

DETAILED DESCRIPTION

Figure 1A:
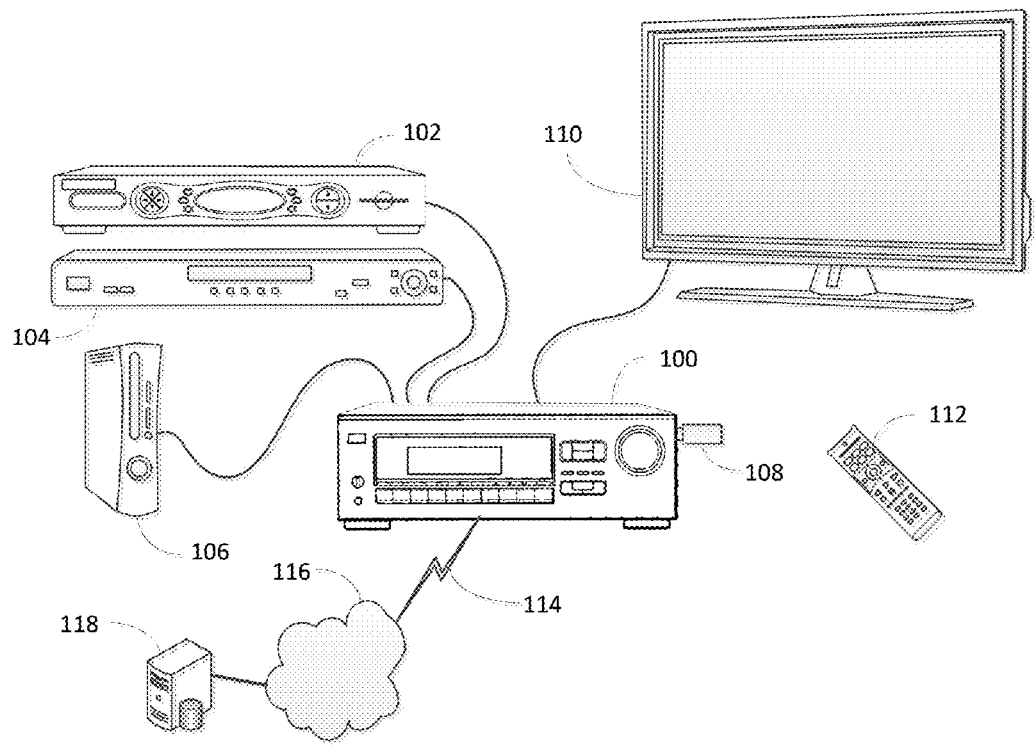
FIGS. 1A and 1B illustrate exemplary systems in which the described methods may be utilized.

Turning now to FIG. 1A, there is illustrated an exemplary home entertainment system in which the audio and/or video outputs of a group of various media source devices such as for example a set top box ("STB") 102, a DVD player 104, a game console 106, and a media streaming adapter 108 are all connected to audio and/or video inputs of an AV receiver 100. AV receiver 100 in turn functions to switch the currently desired input media stream, being received at one or more of the audio and/or video inputs of the AV receiver, to a designated audio and/or video output of AV receiver 100 which is connected to an output capable device, such as television 110. In some embodiments AV receiver 100 may also include a wired or wireless network interface which may be used for the routing of media, for example media being wirelessly streamed via a WiFi connection 114, from or to other areas of the home. When included, such a network interface may also be available for Internet access 116, downloading of firmware updates and/or other data into AV receiver 100 from a remote database 118, etc., as is well known in the art. Also illustrated is a user input device 112, such as a remote control, smartphone app, etc., which may be used to command functional operation of various devices, navigate GUI menu systems provided by various devices, etc., using any convenient IR, RF, Point-to-Point, or networked protocol. In keeping with the teachings of the subject disclosure which follow, AV receiver 100 may be provisioned with methods to filter CEC command requests received from source devices 102 through 108.

Figure 1B:
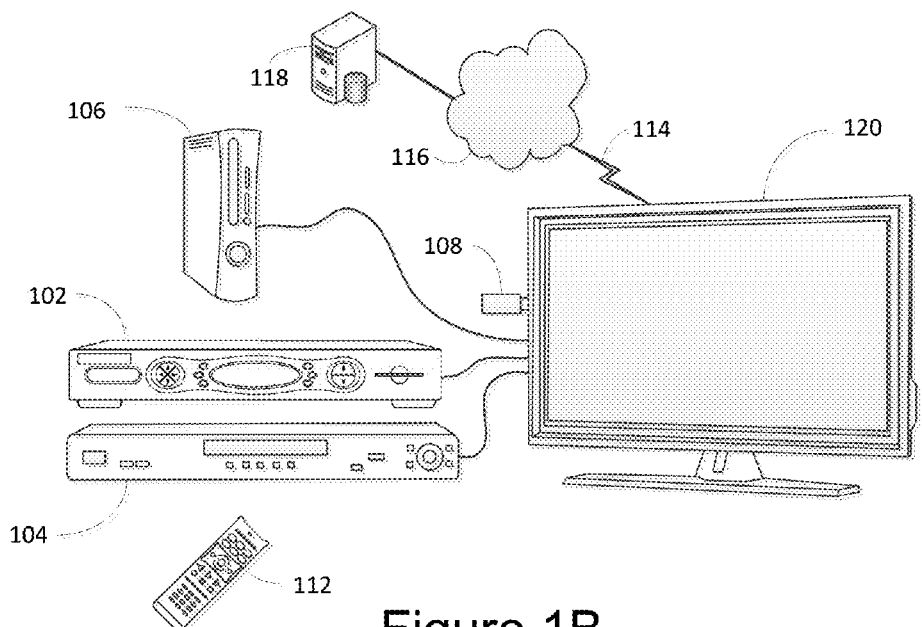

With reference to FIG. 1B, in an alternate exemplary embodiment the various media source appliances 102 through 108 may be connected directly to a television 120. In this example, a television 120 may be provisioned with methods to filter CEC command requests received from source devices 102 through 108. As will be appreciated, the implementation of such methods in TV 120 may be generally analogous to those of AV receiver 100 and accordingly, the following detailed exemplary embodiment will be presented in terms of AV receiver 100, it being understood that those principles may be applied, mutatis mutandis, to television 120, or for that matter, to any other device which may benefit from such capability.

Figure 2:
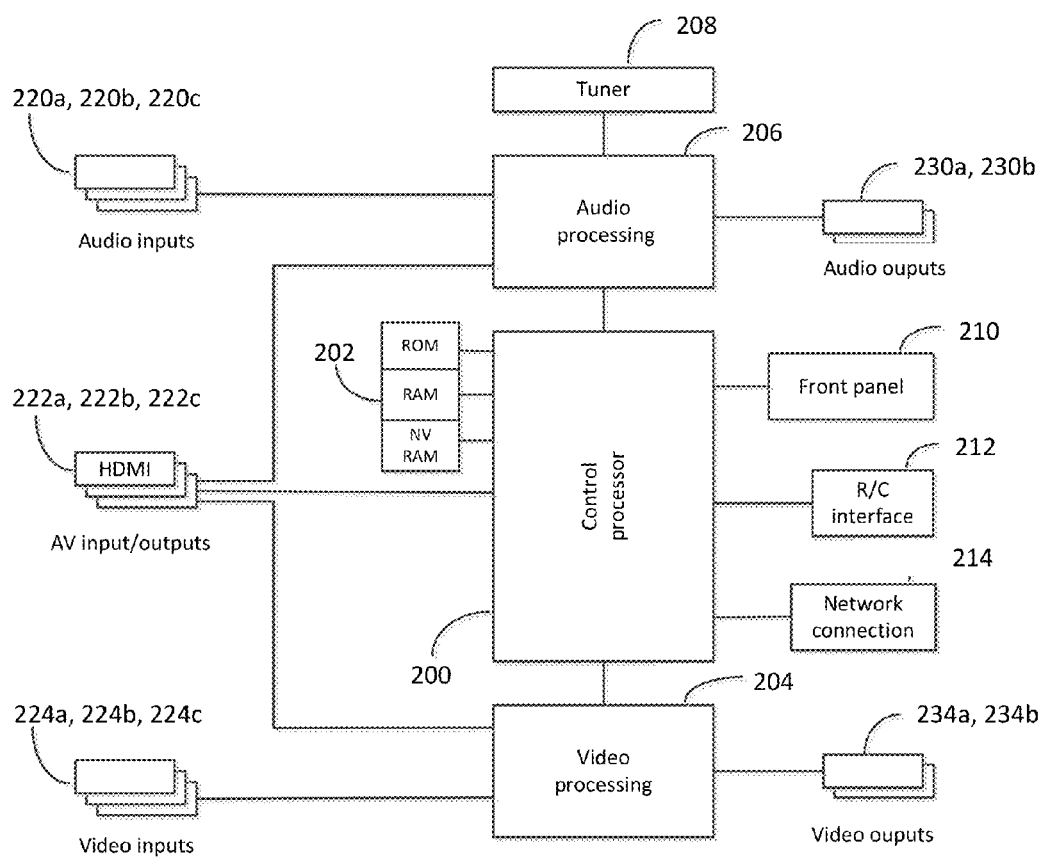
FIG. 2 illustrates a block diagram of the exemplary AV receiver of FIGS. 1A and 1B.

With reference now to FIG. 2, an exemplary AV receiver 100 may include, as needed for a particular application, a control processor 200 coupled to a non-transient memory element 202 which may comprise any combination of ROM, RAM, and/or non-volatile read/write memory; video and audio processing sections 204, 206; a tuner 208 for reception of radio broadcast channels; a front panel 210 including user controls and/or a display; a remote control interface 212 for communicating with a controlling device 112; a wired or wireless network interface 214 for communication with a local and/or wide area network; audio inputs 220a through 220c; video inputs 224a through 224c; digital AV interfaces such as HDMI ports 222a through 222c; audio outputs 230a, 230b; and video outputs 234a and 234b. As will be appreciated, audio and video inputs and outputs (which may be more or less in number than illustrated) may comprise analog or digital signals and exemplary AV receiver 102 may be provisioned with analog-to-digital (ADC) converters, digital-to-analog (DAC) converters, video decoders, HDMI encoder/decoders, CODECs, format converters, etc., all as necessary to implement the input/output switching and routing functionality. It will be further appreciated that the functionality of video and audio processing blocks 204 and 208 may be implemented in separate components such as a specialized digital signal processors (DSP), may be implemented as part of control processor 400, or any combination thereof, and that portions of memory 202 may be allocated to or associated with audio and video processing blocks 202,208.

It will also be appreciated that some or all of devices that comprise the memory element 202 may take the form of a chip, a hard disk, a magnetic disk, an optical disk, FLASH memory, and/or the like, and that all or portion of the devices that comprise the memory element 202 may be physically incorporated within the same IC chip as the control processor 200 and/or audio or video processing blocks 204,206 and, as such, memory element 202 is shown separately in FIG. 2 only for the sake of clarity.

As will be understood by those skilled in the art, some or all of devices that comprise the memory element 202 may include executable instructions that are intended to be executed by the processor 200 to control the operation of the AV receiver 100 (hereafter, the "AV receiver operating program"). In this manner, the processor 200 may be programmed to control the various electronic components within the AV receiver, e.g., to monitor the front panel 210 and or remote control interface 212, to cause the routing of video and/or audio signals between the various inputs and outputs, to control selection of radio broadcast channel by tuner 208, to control volume and equalization settings of audio outputs 230a and 230b; to act on commands received from remote control 112 or on CEC commands received over HDMI interfaces 222a through 222c; etc. Further, the AV receiver operating program, in conjunction with video processing block 204, may provide GUI-based setup menus for AV receiver functions such as input and output assignments, levels, balances, equalization, etc., via a connected video monitor device such as for example TV 108. Since such GUI-based AV receiver setup is well known in the art, for the sake of brevity it will not be described further herein, however if greater detail is desired regarding such features and functionality the interested reader may reference, for example, documents such as the Denon AV Surround Receiver STR-DA5500ES Owner's Manual (D&M Holdings Inc. publication number 5411 10255 000D), the Sony STR-DH820 Multi Channel AV Receiver Operating Instructions (Sony Corp. publication 4-266-497-12), or the like.

In addition, in an exemplary embodiment described herein the AV receiver operating program may include programming which functions to assign and utilize a trustworthiness rating for each CEC-enabled connected source device in order to minimize or eliminate unwanted input switching, which will now be described in further detail.

Referring to FIG. 3A, an exemplary AV receiver operating program may maintain a trustworthiness table 300 in memory element 202 in which is recorded a current trust level for each connected device, i.e. each active HDMI input port. The table size may be dynamic, i.e. with entries created as devices are connected to an HDMI input port (and possibly deleted if a device is disconnected from an HDMI input port); or may be static, i.e. with a fixed number of entries corresponding to the total number of HDMI input ports available, as appropriate for a particular implementation. In the exemplary embodiment presented herein, there are four possible HDMI inputs, and each of the four device entries in the table may comprise a device identity field 302, a device name field 304, and a device trust level field 306. In the event that a device is not connected to an available HDMI input, a "device not connected" data entry may be placed into the table, no data may be placed into the table entry, or the like. As will be appreciated, the AV receiver may be programmed to know which table entry corresponds to which AV input port of the AV receiver.

Within the table, device identity 302 comprises information sufficient to uniquely identify a specific device and may include items such as a CEC vendor ID, data from HDMI Source Product Description (SPD) information frames embedded in the source appliance digital video stream (in accordance with the Consumer Electronics Association specification CEA-861), or any other appropriate information. In this context, for a more detailed description of device identification over digital media interfaces the interested reader may wish to refer to U.S. Pat. No. 8,812,629 "System and Method for Configuring the Remote Control Functionality of a Portable Device" and/or pending U.S. patent application Ser. No. 12/148,444 "Using HDMI-CEC to Identify a Codeset," both of common ownership and incorporated herein by reference in their entirety.

Device name 304 is a user friendly name by which this device is to be referenced in OSD GUI displays. This may be the value obtained in response to a CEC "Device OSD Name" request by the AV receiver operating program, or in other embodiments provision may be made for alternative names, for example downloaded from a device database or manufacturer web site, user-defined, etc. For example, on AV receiver devices in which user-supplied display names may be assigned to input ports as part of a receiver set-up process, device name 302 may comprise those values.

In the exemplary embodiment presented herein, trust level 306 may be assigned one of three possible values, corresponding to the actions to be taken by the AV receiver operating program upon receipt of a CEC input selection request from the listed device: "Trusted," means that the AV receiver operating program will always respond to a request from the listed device by selecting that HDMI input port as the source for the AV stream being rendered, i.e. will always switch inputs to that device when requested by that device. "Untrusted" means that the AV receiver operating program upon receipt of a request from that device will solicit a confirmation from the user, e.g. via a remote control 112 command transmission or the like, prior to performing any input switching operation. The third possible value "Excluded" means that the AV receiver operating program will always ignore input switching requests from the listed device.

In some embodiments, it may be desirable to dynamically adjust the trustworthiness rating of the various devices forming the system based upon the state of certain other devices. For example, if a first device is powered on by a user (e.g., a device identifiable via a received transmission, such as a DVD player, a device that is known to the AV receiver, or a device that is otherwise generally connected to given input port or output port of the AV receiver) while associated other devices are powered off (e.g., a device identifiable via a received transmission, such as a TV monitor, a device that is known to the AV receiver, such as the AV receiver itself, or a device that is otherwise generally connected to given input or output port of the AV receiver), it may be desirable, in this example, that the DVD player issue CEC commands to initiate "power on" and input switching sequences at the AV receiver and TV devices. However, in the same system example, if the AV receiver and TV are already powered on and switched to a different input, it may be appropriate for these devices to ignore such CEC commands from a just-powered DVD player. In this manner, the exemplary system may support "one button" start up when appropriate while still allowing a user to power on the DVD player, for example to remove a disk, without affecting the active state of other devices in the system such as viewing cable DVR content. To this end, in certain implementations the AV receiver operating program input switching logic of a device such as AV receiver 100 may support multiple trustworthiness tables as illustrated in FIG. 3B, each corresponding to a particular state of device 100, for example one table 310 for use when AV receiver 100 is "powered on" and another table 312 for use when AV receiver is "powered off."

Figure 4:
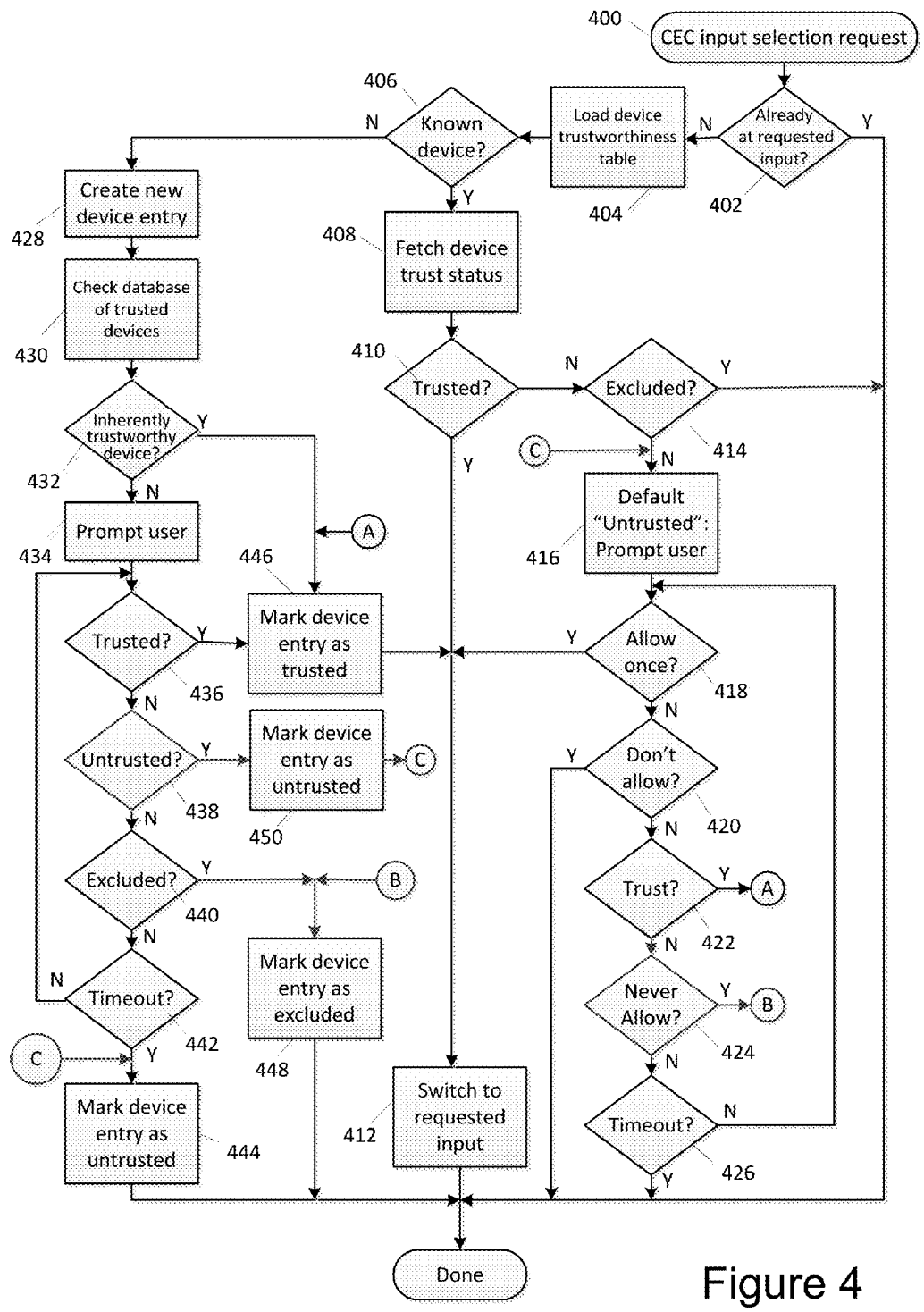
FIG. 4 illustrates in flow chart form an exemplary series of steps which may be performed by an AV receiver operating program.

An exemplary series of steps which may be performed by an AV receiver operating program in implementing the above described methods will now be discussed in greater detail in conjunction with the flowchart presented FIG. 4.

Figure 5:
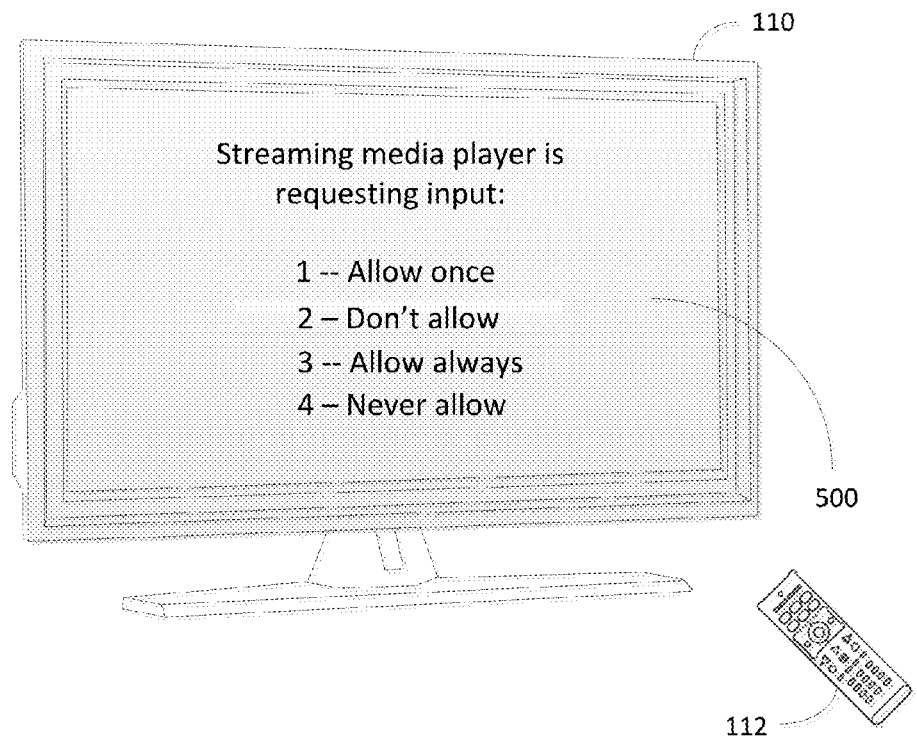
FIGS. 5 and 6 illustrate exemplary user GUI displays which may be utilized in conjunction with the program steps of FIG. 4.

Upon receipt of a CEC input selection request 400 which would be issued from a requesting device, for example in response to a state change thereof, at step 402 the exemplary AV receiver operating program may first check if the requested input is already the AV receiver input source. If so, no further action is required. If not, at step 404, in those implementations which support multiple trustworthiness tables, the appropriate table is selected based on the current state of AV receiver 100, i.e. in the illustrative example one of 310 or 312 based on the powered-up status of AV receiver 100. Next, at step 406 the AV receiver operating program may determine if the requesting device is known to the system, i.e. has a valid entry in the selected trustworthiness table. If so, at step 408 the AV receiver operating program may retrieve the device trust status value 306 corresponding to the requesting device. At step 410 and 414 the AV receiver operating program may examine the retrieved status. If "trusted," then at step 412 the AV receiver operating program may perform the requested input switching operation and processing is complete. If "excluded," then processing ends with no further action taken. If the status is neither "trusted" nor "excluded," then by default the status may be "untrusted" and at step 416 the user may be prompted to confirm or deny the requested action, for example as illustrated in FIG. 5, via a display on television 110. At steps 418 through 426, the exemplary AV receiver operating program may now wait for user input. With reference to FIG. 5, in the exemplary embodiment possible user inputs are: "1—Allow once," step 418, in which case at step 412 the AV receiver operating program may perform the requested input switching operation and processing is complete; "2—Don't allow," step 420, in which case the AV receiver operating program processing ends with no further action taken; "3—Allow always," step 422, in which case at step 446 the AV receiver operating program may update the trust level status field 306 corresponding to this device to "trusted," and thereafter may perform the requested input switching operation at step 412, after which processing is complete; and "4—Never allow," step 424, in which case at step 448 the AV receiver operating program may update the trust level status field 306 corresponding to this device to "excluded," and end processing with no further action taken. If no user input is received within an appropriate period of time, then at step 426 the AV receiver operating program may complete processing with no action taken, i.e. in the event a user is not present, is inattentive, etc.

Returning now to step 406, if the requesting device is not known to the system, i.e. is associated with a previously unused HDMI input port, is a replacement for a previously connected and identified device, etc., at step 428 the AV receiver operating program may create or initialize a new device entry in the device trustworthiness table. Next, at step 430, the AV receiver operating program may cause identity data obtained from the new device to be compared against a database of trusted devices. Such identity data may comprise Consumer Electronic Control (CEC) retrievable data, Extended Display Identification Data (EDID), data from Source Product Description (SPD) information frames, or any other available information as appropriate to uniquely identify the device by make and model, for example by using the methods described in previously referenced U.S. Pat. No. 8,812,629 or pending U.S. patent application Ser. No. 12/148,444, both incorporated herein by reference. The database of trusted devices may be local, i.e. stored in AV receiver memory 202, or may be located at a remote server 118 accessible via Internet connection 114,116. As appropriate for a particular embodiment, an exemplary database of trusted devices may be as simple as a stand-alone list of trusted devices (for example a manufacturer-supplied list of compatible models of the same brand as AV receiver 100), or may comprise part of a larger database of device capabilities, for example in the form of an additional entry in the appliance data record described in U.S. Pat. No. 8,812,629. At step 422, if the new device can be located in the trusted device database, at step 446 the corresponding device entry in the newly created or initialized trustworthiness table 300 may be marked as "trusted," after which at step 412 the AV receiver operating program may perform the requested input switching operation and processing is complete Although not illustrated, it will be appreciated that in certain embodiments a "black list" of devices which are to be automatically excluded may also be maintained and processed in a similar manner.

Figure 6:
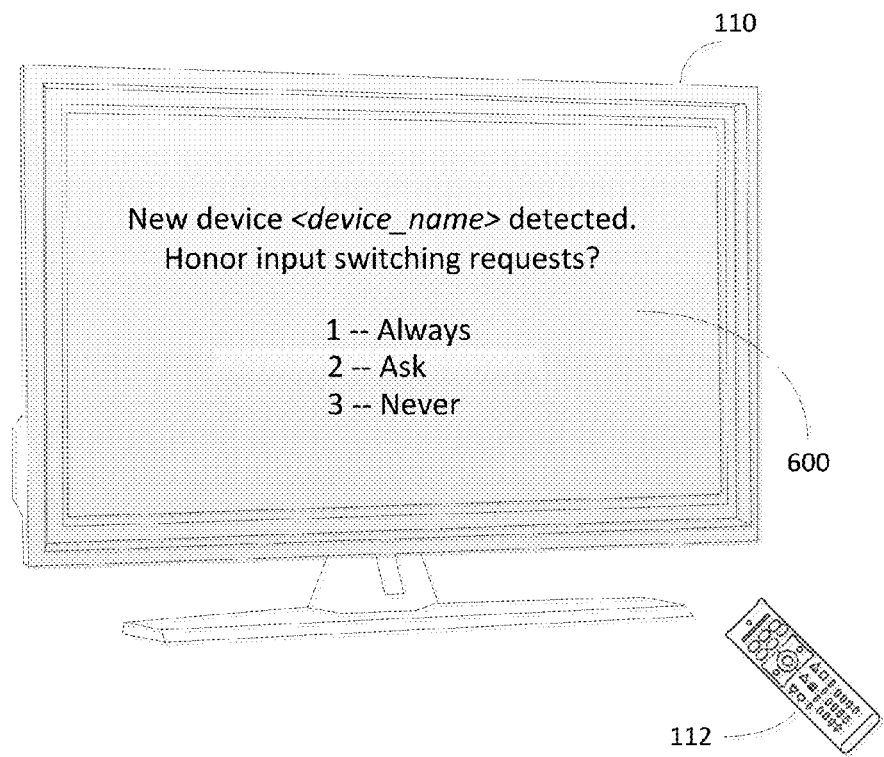

If the requesting device identity does not correspond to any entry in the database of trusted devices, then at step 434 the user may be prompted to assign a trust category for the new device, for example as illustrated in FIG. 6, via a display on television 110. At steps 436 through 442, the exemplary AV receiver operating program may now wait for user input. With reference to FIG. 6, in the exemplary embodiment possible user inputs are: "1—Always," step 436, in which case at step 446 the AV receiver operating program may cause the corresponding device entry in the newly created or initialized trustworthiness table 300 may be marked as "trusted," after which at step 412 the AV receiver operating program may perform the requested input switching operation and processing is complete; "2—Ask," step 438, in which case at step 450 the AV receiver operating program may cause the corresponding device entry in the newly created or initialized trustworthiness table 300 may be marked as "untrusted," after which processing may continue at step 416, soliciting further user input as described previously in conjunction with FIG. 5; and "3—Never," step 440, in which case at step 448 the AV receiver operating program may cause the corresponding device entry in the newly created or initialized trustworthiness table 300 may be marked as "excluded" and processing may end with no further action taken. If no user input is received within an appropriate period of time, then at step 442 the AV receiver operating program may cause the corresponding device entry in the newly created or initialized trustworthiness table 300 to be marked as "untrusted" and processing may end with no further action taken, i.e. in the event a user is not present, is inattentive, etc., the default is to assign an "untrusted" status to a newly detected device.

As will appreciated, in additional to the above described initial assignment of a trustworthiness level to a newly connected device, in some embodiments the user may also be offered the ability to modify the trustworthiness levels of existing devices as one of the choices in an AV receiver or television device's conventional GUI based set-up and configuration menu.

While various concepts have been described in detail, it will be appreciated by those skilled in the art that various modifications and alternatives to those concepts could be developed in light of the overall teachings of the disclosure. For example, while the exemplary embodiment presented herein is focused on the prevention of unwanted CEC-initiated input switching operations, it will be appreciated that the teachings and techniques presented may readily be extended to encompass other CEC or otherwise enabled functionalities such as control of power, volume, transport operations, etc. Similarly, in the event that the AV receiver recognizes a command received from a particular input port as originating from a device connected thereto, the table need not maintain device identity data. Rather, the mere receipt of a command at a given input port can be used by the AV receiver as the equivalent of a command being received with a specific device identifier. Further, in such a use case it will incumbent upon the user to assign a trust category for a device attached to an input as the above-described lookup methodology will not be useful.

It is also to be understood that, while described in the context of functional modules and illustrated using block diagram format, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof. All patents cited within this document are hereby incorporated by reference in their entirety.

What is claimed is:

1. A method for controlling a state functional operation of a first controllable appliance, comprising:

receiving at the first controllable appliance from a second controllable appliance a command communication, the command communication comprising at least a command for causing the first controllable appliance to be placed into a state; and in response to the first controllable appliance receiving the command communication, causing the first controllable appliance to automatically ignore the received command for causing the first controllable appliance to be placed into the first state and to automatically designate within a data store associated with the first controllable appliance the second controllable appliance as having a trust level of being untrustworthy, whereupon the first controllable appliance will automatically ignore any subsequently received commands for causing the first controllable appliance to be placed into the first state as transmitted by the second controllable appliance until such time as the designation within the data store is caused to be changed, when the first controllable appliance is incapable of determining the trust level for the second controllable appliance upon receiving the command communication from the second controllable appliance and a predetermined period of time, caused to be measured by the first controllable appliance as a result of receiving the command communication from the second controllable appliance, has lapsed within which a user is requested to at least confirm whether or not the first controllable appliance is to be caused to execute the received command for causing the first controllable appliance to be placed into the first state.

2. The method as recited in claim 1, wherein the first controllable appliance attempts to determine the trust level of the second controllable appliance by determining if a trust level setting for the second controllable appliance is stored in the data store associated with the first controllable appliance.

3. The method as recited in claim 2, further comprising using by the first controllable appliance a device identifier for the second controllable appliance included in the command communication when attempting to determine the trust level of the second controllable appliance.

4. The method as recited in claim 2, further comprising using by the first controllable appliance to an input port of the first controllable appliance from which the command communication is received from the second controllable appliance when attempting to determine the trust level of the second controllable appliance.

5. The method as recited in claim 2, wherein the first controllable appliance attempts to determine the trust level of the second controllable appliance by requesting a trust level setting for the second controllable appliance from a device located remotely from the first controllable appliance.

6. The method as recited in claim 5, further comprising using the first controllable appliance a device identifier for the second controllable appliance when requesting the trust level setting for the second controllable appliance from the device located remotely from the first controllable appliance.

7. The method as recited in claim 6, wherein the device identifier for the second controllable appliance is obtained from the second controllable appliance.

8. The method as recited in claim 5, wherein the device located remotely from the first controllable appliance comprises an Internet server device having an associated data repository in which trust level settings for appliances are stored.

9. The method as recited in claim 2, further comprising causing the first controllable appliance to automatically set the trust level setting for the second controllable appliance stored in the data repository associated with the first controllable appliance to trustworthy when the first controllable appliance receives a user confirmation that the first controllable appliance is to be caused to execute the command for causing the first controllable appliance to be placed into the first state when the first controllable appliance first determines that the second controllable appliance is neither trustworthy nor untrustworthy.

10. The method as recited in claim 2, further comprising causing the first controllable appliance to automatically set the trust level setting for the second controllable appliance stored in the data repository associated with the first controllable appliance to untrustworthy when the first controllable appliance receives a user confirmation that the first controllable appliance is not to be caused to execute the command for causing the first controllable appliance to be placed into the first state when the first controllable appliance first determines that the second controllable appliance is neither trustworthy nor untrustworthy.

11. The method as recited in claim 1, wherein the state comprises a state in which a one of a plurality of audio and/or video inputs of the first controllable appliance is rendered active.

12. The method as recited in claim 11, wherein the first controllable appliance comprises an audio-video receiver.

13. The method as recited in claim 12, wherein the second controllable appliance comprises an audio and/or video source device coupled to the audio-video receiver via a one of the plurality of audio and/or video inputs.

14. The method as recited in claim 13, wherein the command communication comprises a CEC command communication.

15. The method as recited in claim 11, wherein the first controllable appliance comprises a television receiver.

16. The method as recited in claim 15, wherein the second controllable appliance comprises an audio and/or video source device coupled to the television receiver via a one of the plurality of audio and/or video inputs.

17. The method as recited in claim 16, wherein the command communication comprises a CEC command communication.

* * * * *